US006971831B2

(12) United States Patent
Fattori et al.

(10) Patent No.: US 6,971,831 B2
(45) Date of Patent: Dec. 6, 2005

(54) SELF-LOCKING FASTENER

(75) Inventors: James G. Fattori, Trevose, PA (US); Anthony J. Lesenskyj, Lawrenceville, NJ (US); George Lesenskyj, Robbinsville, NJ (US)

(73) Assignee: LMT Mercer Group, Inc., Lawrenceville, NJ (US)

( * ) Notice: Subject to any disclaimer, the term of this patent is extended or adjusted under 35 U.S.C. 154(b) by 53 days.

(21) Appl. No.: 10/414,911

(22) Filed: Apr. 16, 2003

(65) Prior Publication Data

US 2004/0208728 A1  Oct. 21, 2004

(51) Int. Cl.[7] ............................................. F16B 19/00
(52) U.S. Cl. ..................... 411/508; 16/2.1; 439/571; 439/687; 403/256; 174/65; 174/153 G
(58) Field of Search ................ 411/508–512, 913; 24/453, 573, 297–298; 16/2.1; 174/65, 153; 403/256; 439/571, 681

(56) References Cited

U.S. PATENT DOCUMENTS

| | | | | |
|---|---|---|---|---|
| 2,424,757 A | * | 7/1947 | Klumpp, Jr. ............. 174/153 G |
| 2,560,530 A | * | 7/1951 | Burdick ....................... 411/508 |
| 3,372,960 A | * | 3/1968 | Fisher ......................... 384/439 |
| 4,014,245 A | * | 3/1977 | Frye et al. .................. 411/352 |
| 4,373,826 A | | 2/1983 | Inamoto et al. .............. 403/14 |
| 4,495,380 A | | 1/1985 | Ryan et al. ................. 174/138 |
| 4,524,494 A | | 6/1985 | Sato et al. .................... 24/453 |
| 4,540,160 A | * | 9/1985 | Zanavich et al. ............. 256/19 |
| 4,629,356 A | | 12/1986 | Hayashi .................. 403/408.1 |
| 4,762,437 A | | 8/1988 | Mitomi .................... 403/406.1 |
| 4,781,488 A | | 11/1988 | Hayashi .................. 403/408.1 |
| 4,821,481 A | * | 4/1989 | Woodman ..................... 52/664 |
| 4,920,618 A | | 5/1990 | Iguchi .......................... 24/453 |
| 4,922,587 A | * | 5/1990 | Pettit ............................ 24/453 |
| 5,173,026 A | | 12/1992 | Cordola et al. ............. 411/508 |
| 5,178,561 A | * | 1/1993 | Lindeberg et al. .......... 439/571 |
| 5,191,513 A | | 3/1993 | Sugiura et al. ............. 361/399 |
| 5,255,897 A | | 10/1993 | Pepper ......................... 256/24 |
| 5,445,362 A | | 8/1995 | Reppert ....................... 256/24 |
| 5,537,714 A | * | 7/1996 | Lynch et al. .................. 16/2.1 |
| 5,584,725 A | * | 12/1996 | Tseng et al. ................ 439/572 |
| 5,592,719 A | | 1/1997 | Eto et al. ...................... 24/453 |
| 5,601,453 A | * | 2/1997 | Horchler ..................... 439/567 |
| 5,632,584 A | * | 5/1997 | Acevedo ..................... 411/182 |
| 5,689,863 A | | 11/1997 | Sinozaki ...................... 24/297 |
| 5,704,753 A | | 1/1998 | Ueno .......................... 411/509 |
| 5,758,987 A | * | 6/1998 | Frame et al. ............... 403/298 |
| 6,042,296 A | | 3/2000 | Wittig et al. ................ 403/298 |
| 6,135,425 A | | 10/2000 | Platt ............................ 256/66 |
| 6,500,028 B1 | * | 12/2002 | Higuchi ...................... 439/607 |

* cited by examiner

*Primary Examiner*—Robert J. Sandy
*Assistant Examiner*—Jeffrey A. Sharp
(74) *Attorney, Agent, or Firm*—Kenneth Watov; Watov & Kipnes, P.C.

(57) ABSTRACT

A fastener for securing first and second members together at opposing respective flat surfaces thereof, whereby at the point of joining the first member has an aperture concentric with an aperture of the second member, the fastener comprising first and second tubular portions concentric with one another, whereby the second tubular portion is of reduced outside diameter relative to the first tubular portion, a circular flange forming a transverse interior end of the first tubular portion, an interior end of the second tubular portion being rigidly joined to the circular flange, at least one resilient arm being formed in and extending from a sidewall of each one of the first and second tubular portions toward the flange, the at least one resilient arm of each portions each having a free end including a retaining end surface adapted for having close proximity to a side portion surrounding the respective apertures of the first and second members.

33 Claims, 16 Drawing Sheets

SELF-LOCKING FASTENER

FIELD OF THE INVENTION

The present invention relates generally to fasteners, and more particularly to fasteners for securing members such as fence components, printed circuit boards, sheet materials, and so forth, to one another without the use of tools.

BACKGROUND OF THE INVENTION

People have used fences through the centuries for marking boundaries and territories, controlling ingress and egress, enhancing privacy and quietude, promoting security and the like. Most fences are typically assembled with the use of conventional fasteners such as nuts and bolts, rivets, clamps, nails, screws, wires and the like. Although such fasteners have been found to be acceptable for securely attaching fence members to one another (e.g., vertical pickets/slats to horizontal rails, or horizontal rails to fence posts), they typically require tools for installation. Such fasteners also make the overall assembly of the fence more expensive, labor intensive and time consuming. Many of the fasteners used are also difficult to hide or conceal, and often detract from the aesthetic appearance of the assembled fence.

In recent years, fences fabricated from plastic materials such as polyvinylchloride (PVC), have become increasingly popular among homeowners due to continuing advances in manufacturing and design. Fences fabricated from plastics now exhibit better durability, improved quality and appearance, and enhanced product life, and such fences require little or no maintenance on the part of the fence owner. Typically, the fence is constructed by mounting an exterior surface of a vertical fence member to an exterior portion of a horizontal cross support member. The fence members are usually hollow and must be fastened to one another through use of glue or an adhesive, or self-tapping screws, or other fasteners. Tools are typically required to install the fasteners. Moreover, the outwardly facing surfaces of the fence members must be drilled with holes in order to allow access to the fasteners during assembly. The drilled holes must subsequently be plugged or concealed with plastic caps or some other sealing means. The plugged holes can adversely affect the appearance of the finished fence. The use of such fasteners represents additional costs in terms of parts, labor and time.

For the foregoing reasons, there is a need for a fastener that reduces the time and expense required for assembling structures such as, for example, fences. There is a need for a fastener that enhances the strength and durability as well as the appearance of the assembled structure. There is a further need for a fastener that is easy and cost effective to produce and implement, and which can reduce the reliance on tools for facilitating installation. Such a fastener may have broader use than for securing fence members, such as, for example, printed circuit boards, and sheet materials.

SUMMARY OF THE INVENTION

The present invention is directed generally to a fastener which is adapted for effectively securing structural members, sheet materials, and other components to be secured together with opposing surfaces abutting one another to form a durably intact structure. The fastener of the present invention is readily installed without tools to achieve enhanced convenience and expediency. The fastener of the present invention provides the assembled structure with outstanding strength and durability especially at points of securement. The fastener can be readily adapted to secure members selected from, for example, fence members, printed circuit boards, panels, furniture parts and the like. In particular, the fastener is capable of securing a first member having an aperture therethrough to a second member having an aperture therethrough that is aligned with the aperture of the first member. The fastener includes a tubular construction having first and second opposed ends. Each of the first and second opposed ends are adapted to be inserted into one of the apertures associated with the first and second ends, respectively, and to be securely retained therein, thus resulting in the securement of the first and second members together.

In one aspect of the present invention, there is provided a fastener for securing first and second members together at opposing respective flat surfaces thereof whereby at the point of joining the first member has an aperture concentric with an aperture of the second member, in which the fastener comprises:

first and second tubular portions concentric with one another whereby the second tubular portion is of reduced outside diameter relative to the first tubular portion;

a circular flange forming a transverse interior end of the first tubular portion, an interior end of the second tubular portion being rigidly joined to the circular flange;

at least one resilient first arm being formed in and extending from a sidewall of the second tubular portion toward an outer face of the flange, the at least one resilient first arm having a free end including a retaining end surface adapted for having close proximity to a first side of and surrounding the aperture of the first member, the free end of the first arm being tapered outwardly from the sidewall, and being resiliently inwardly movable by camming contact with the periphery of the aperture in the first member as the at least one resilient first arm passes through the aperture in the first member, whereby when the retaining end surface moves free of the aperture, the at least one resilient first arm moves outwardly for captively retaining the member between the flange and the retaining end surface of the first arm; and at least one resilient second arm being formed in and extending from a sidewall of the first tubular portion toward an inside face of the flange, the at least one resilient second arm having a free end including a retaining end surface adapted for having close proximity to a first side of and surrounding the aperture of the second member, the free end of the second arm being tapered outwardly from the sidewall of the first member, and being resiliently and inwardly movable by camming contact with the periphery of the aperture in the second member as the at least one resilient second arm passes through the aperture in the second member, whereby when the retaining end surface moves free of the aperture, the at least one resilient second arm moves outward for captively retaining the second member between a second side of the first member and the retaining end surface of the second arm.

BRIEF DESCRIPTION OF THE DRAWINGS

Various embodiments of the invention are described in detail below with reference to the drawings, in which like items are identified by the same reference designation, wherein.

DETAILED DESCRIPTION OF THE INVENTION

Figure 1A:
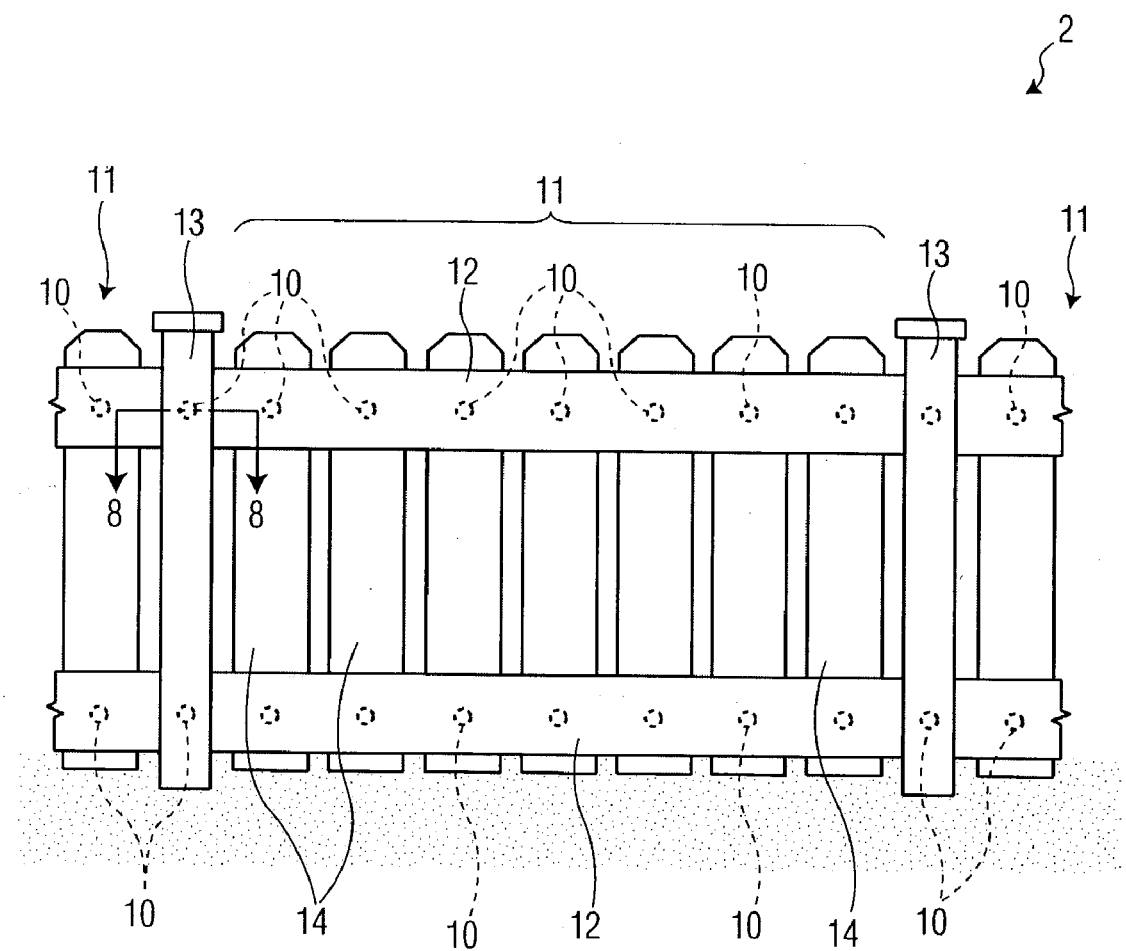
FIG. 1A is an elevational view of a plurality of fencing slats mounted to cross supports thereby defining a fence unit where several fence units are similarly mounted on two posts all of which are using a plurality of fasteners to form a fence section in accordance with the present invention.

Referring now to the drawings in detail, and more specifically to FIG. 1A, a plurality of components are secured to one another by a plurality of fasteners 10 of the present invention for forming a fence 2. Each fence section 11 typically includes one or more horizontal cross supports 12 adapted for supporting a plurality of vertical fence members 14 which are typically in the form of spindles, pickets or slats, or which can be any transversely extended material. The fence members or fence slats 14 are each secured to the cross supports 12 by the fasteners 10 of the present invention which, after assembly, are hidden within the fence 2. The fence members 14 can be vertically or diagonally oriented and can be constructed from material forming a mesh, lattice, vertical pickets, or other means of prohibiting access therethrough. The cross supports 12 are further secured to a pair of posts or stationary supports 13 via the fasteners 10 to assemble a fence section 11. Each fastener 10 is used to secure an end of one fence member to an end of a second fence member such as the fence section 11 to one of the stationary supports 13 which can, for example, be a post or a wall. Although the description below is an example of use of the fasteners 10 for connecting the fence slats 14 to the cross supports 12, the fasteners 10 are also applicable, for example, for use in joining the cross supports 12 to the posts 13, and for use in numerous other configurations for joining individual members together.

Figure 1B:
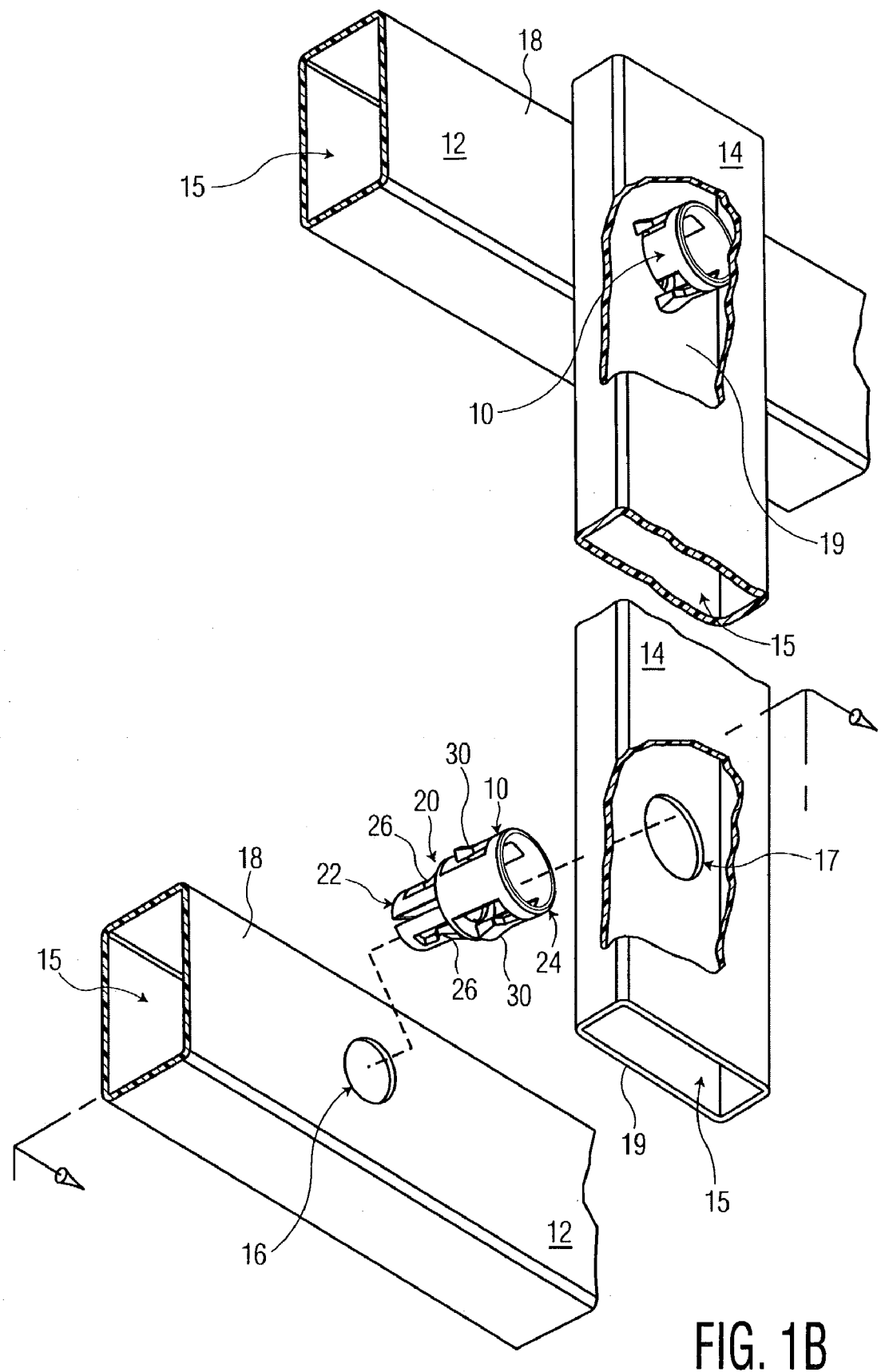
FIG. 1B is a perspective view of a portion of a single fence unit showing a pair of fasteners used for securing a fence slat to cross supports with the lower portion shown in exploded assembly to illustrate the attachment of fence parts to one another in accordance with one embodiment of the present invention.

The overall arrangement of the preferred construction of the fastener 10 for securing fence members to one another such as the fence slat 14 to the cross support 12 can best be understood by reference to FIG. 1B. As noted above, the fastener 10 and method of using the same are equally applicable for use in joining other of the various fence components together. Referring to FIG. 1B, a fastener identified herein by reference numeral 10 is shown for one embodiment of the present invention. Although, the fastener 10 is depicted for use in context of the fence 2 shown in FIG. 1A, it is not limited to securing fence members, and can be used in other applications where fasteners are needed for securing or joining two or more members such as, for example, printed circuit boards, flat plates or panels, hollow members and the like, as would be known by one skilled in the art.

Figure 3:
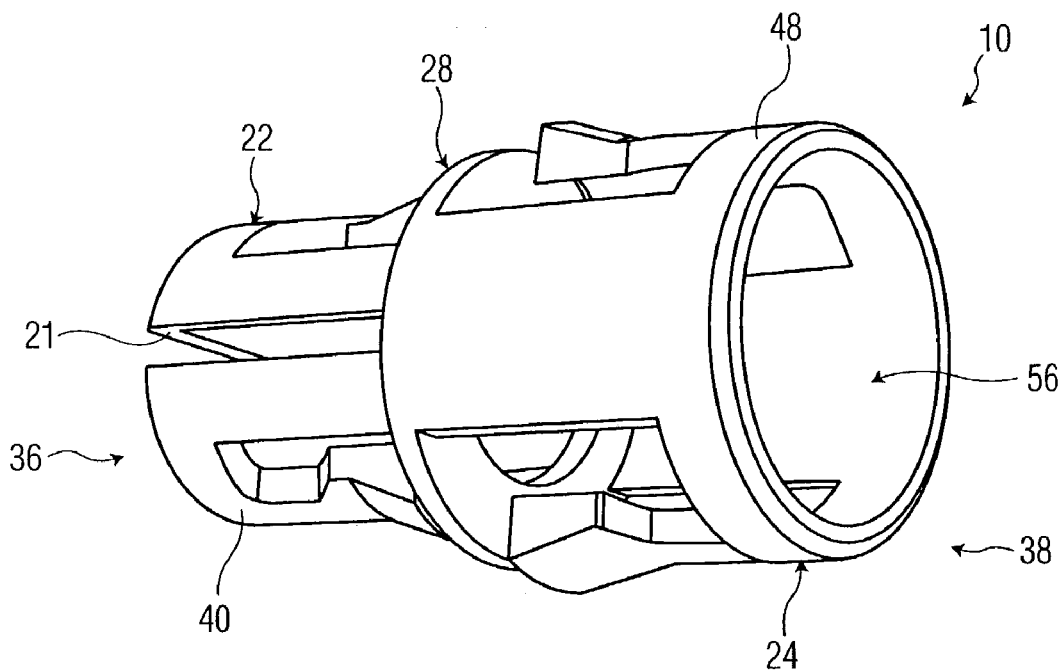
FIG. 3 is a side perspective view towards a second end of the fastener relative to the view shown in FIG. 2.

The fastener 10 is typically composed of a unitary plastic construction, and is formed in the general shape of a tube having two opposed ends. In particular, the fastener 10 comprises a substantially tubular body 20 having a first tubular member 22, an opposed second tubular member 24 and an interior bore 56 (see FIG. 3) extending therethrough. In the present embodiment, the outer diameter of the first tubular portion 22 is typically smaller than the outer diameter of the second tubular portion 24. The first and second tubular portions 22 and 24 each include anchoring means for securely engaging and retaining a portion of the respective fence members to yield a secure connection therebetween, as will be further described in detail below. Note that for purposes of showing the preferred embodiments of the invention, and ease of illustration, the fastener embodiments are shown in a tubular configuration, but the invention is not meant to be so limited. Any other practical shape can be used without departing from the spirit and scope of the present invention.

With further reference to FIG. 1B, the cross support 12 and the fence slat 14 are arranged perpendicular to one another, and include sidewalls 18 and 19, respectively. Each of the sidewalls 18 and 19 of the cross support 12 and the fence slat 14, respectively, define interior cavities 15. The cross support 12 includes at least one aperture 16 in the sidewall 18, which is sized to receive the first tubular portion 22 of the fastener 10 for retainment within the interior cavity 15 thereof. Correspondingly, the fence slat 14 includes one aperture 17 in the sidewall 19, which is sized to receive the second tubular portion 24 of the fastener 10 for retainment within the interior cavity 15 thereof. The portions of the cross support 12 and the fence slat 14 to be joined are placed proximate to one another with the respective apertures 16 and 17 concentrically aligned to form a joint pathway between the respective interior cavities 15 of the cross support 12 and the fence slat 14 to be joined.

The fastener 10 is shown in position for use to secure the fence slat 14 to the cross support 12 at a portion where they cross one another. The first tubular portion 22 of the fastener 10 includes a pair of opposed resilient first arms 26 each extending longitudinally towards the second tubular portion 24 within opposed cutout portions or recesses 42 (see FIG. 2). The first arms 26 are adapted to reversibly move radially inward into the interior bore 56 (see FIG. 3) to a loaded position when external pressure is applied thereto.

The cross support 12 includes a periphery or hole edge extending around its associated aperture 16, which is appropriately dimensioned to allow the first tubular portion 22 to be inserted therethrough as the periphery of the aperture 16 forces the first arms 26 to bend inward to generate a camming action. Once the ends of the first arms 26 have passed beneath the periphery of the aperture 16, they spring back outwardly into the unloaded position, and thereby underlay the periphery of the aperture 16 along the adjacent inside surface of the sidewall 18 of the cross support 12, thereby preventing the first tubular portion 22 from being withdrawn from the aperture 16. More specifically, the sidewall 18 of the support 12 is captively retained between an annular flange 28 (shown best in FIG. 2) defining a shoulder surface 32 and the "unloaded" free ends of the first arms 26, thereby effectively holding the fastener 10 in place. Optionally, the first tubular portion 22 may further include a slot 21 extending therethrough for facilitating insertion.

Figure 2:
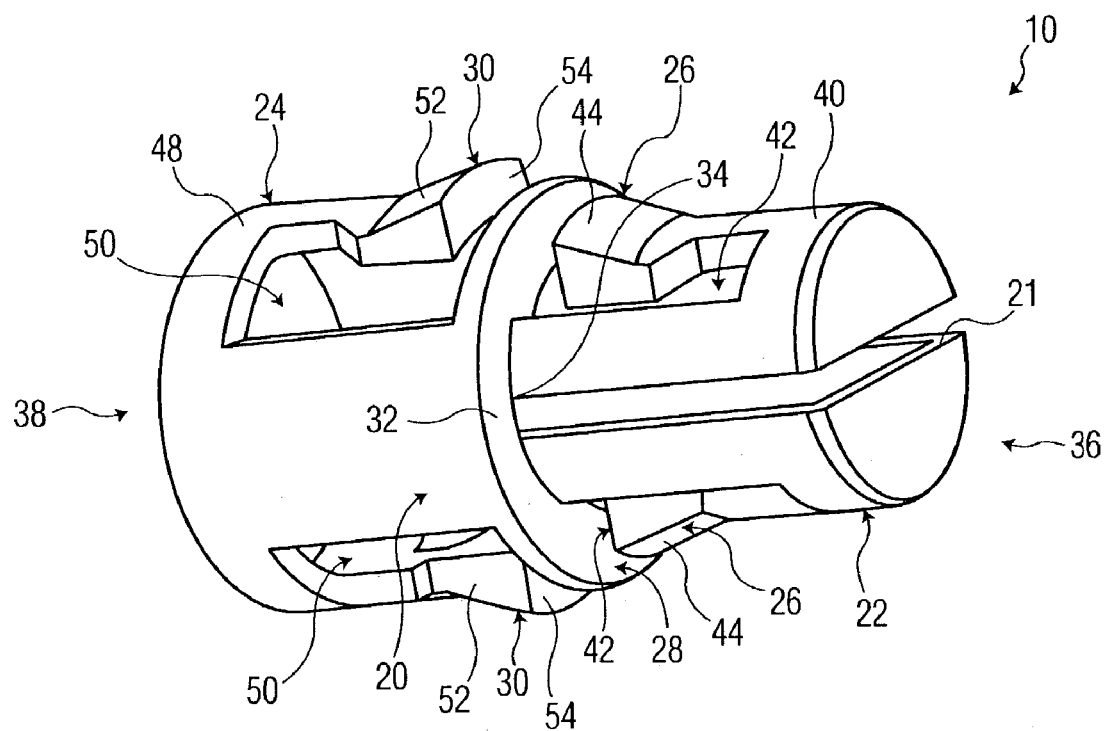
FIG. 2 is a side perspective view towards a first end of the fastener in accordance with the present invention.

Similarly, the second tubular portion 24 of the fastener 10 includes a pair of opposed resilient second arms 30 each having free ends extending longitudinally towards the first tubular portion 22 within opposed cutout portions or recesses 50 (see FIG. 2). The second arms 30 are adapted to reversibly move radially inward into the interior bore 56 (see FIG. 3) to a loaded position when external pressure is applied thereto. The fence slat 14 includes a periphery or hole edge extending around the aperture 17, which is appropriately dimensioned to allow the second tubular portion 24 to be inserted therethrough. As the slat 14 is moved toward the cross support 12, the periphery of the aperture 17 forces the second arms 30 to bend inward. Once the second arms 30 have passed beneath the periphery of the aperture 17, they are free to spring back outwardly into the unloaded position, and thereby underlay the periphery of the aperture 16 along the adjacent inside surface of the sidewall 19, thereby preventing the second tubular portion 24 from being withdrawn from the aperture 17 of the fence slat 14. With the second arms 30 in the unloaded position, the sidewall 19 is captively retained between the sidewall 18 of the cross support 12 on one side and the "unloaded" free ends of the second arms 30 on the other side, thus holding the fastener 10 in place. As a result, the fence slat 14 is securely attached and joined to the cross support 12 by the fastener 10.

With reference to FIGS. 2 to 7, the fastener 10 is shown in greater detail for one embodiment of the present invention. As shown specifically in FIGS. 2 and 3, the fastener 10 comprises the tubular body 20 and the interior bore 56. The tubular body 20 is substantially elongated along its longitudinal axis, and includes the first and second opposed tubular members 22 and 24, respectively, at its respective distal ends 36 and 38. The second tubular portion 24 includes a larger outer diameter than the first tubular portion 22. The annular flange 28 is formed at the interior end of the second tubular portion 24, which further includes a shoulder surface 32 extending along a base portion 34 of the first tubular portion 22. As shown in this example, the outside diameter of the flange 28 is greater than the outside diameter of the first tubular portion 22, and equal to the outside diameter of the second tubular portion 24. However, these relative diameters are not meant to be limiting, whereby for example, the diameter of the second tubular portion 24 can be the same as the diameter of the first tubular portion 22 in another embodiment, with the flange 28 being greater in diameter than each portion 22 and 24.

The first tubular portion 22 includes the pair of opposed resilient first arms 26 each of which extend in the direction towards the flange 28 from an end portion 40 thereof proximate the distal end 36 of the body 20. The first arms 26 reside in recesses 42 which are located on opposed sides of the first tubular portion 22 to allow the arms 26 to move freely therein. Each of the resilient first arms 26 includes a free end 44 having an outside surface which protrudes radially outward to form a lip and gradually tapers towards the end attached to the first tubular portion 22. As noted above, each free end 44 of the first arms 26 is adapted to bias radially outward with respect to the central axis of the first tubular portion 22. The free ends 44 of the first arms 26 further each include a retaining end surface 46 (shown best in FIG. 5) set apart opposite or spaced apart from the shoulder surface 32 of the flange 28. The retaining end surface 46 and the shoulder surface 32 of the flange 28 are adapted to cooperatively retain adjacent sidewall portions about the periphery of the aperture 16 of the cross support 12 therebetween for securely and captively retaining the first tubular portion 22.

The second tubular portion 24 includes the pair of opposed second resilient arms 30 each of which extends in the direction towards the flange 28 from an end portion 48 thereof proximate a distal end 38 of the body 20. The second arms 30 reside in recesses 50 which are located on opposed sides of the second tubular portion 24 to allow the arms 30 to move freely therein. Each of the resilient second arms 30 includes a free end 52 having an outside surface which protrudes radially outward to form a lip, and gradually tapers towards the end portion attached to the second tubular portion 24. As noted above, each of the second arms 30 is adapted to bias radially outward with respect to the central axis of the second tubular portion 24. The free end 52 of the second arms 30 further includes a retaining end surface 54 which is adapted to contact the inside surface of the sidewall 19 of the fence slat 14 for securely and captively retaining the second tubular portion 24.

Each of the first and second arms 26 and 30 is adapted to be flexible so as to permit bending in any direction from the relatively straight, unloaded position to a curved, loaded position. Each arm 26 and 30 is elastically deflectable inward about its fixed ends toward the central axis. In the loaded position, the free ends 44 and 52 of the first and second arms 26 and 30, respectively, occupy the interior bore 56 of the tubular body 20 to allow the fastener 10 to be inserted, as previously described. The first and second arms 26 and 30 are adapted to resiliently return to the resting or unloaded position upon removal of the bending force pushing upon their flared free ends, respectively.

In the present invention, the fastener 10 is preferably composed of plastic, such as polyvinylchloride, polystyrene, polycarbonate, polyamide, and the like, and more preferably thermoplastic materials. However, other suitable materials (e.g., wood, metal, and the like) can also be used for this purpose.

Figure 4:
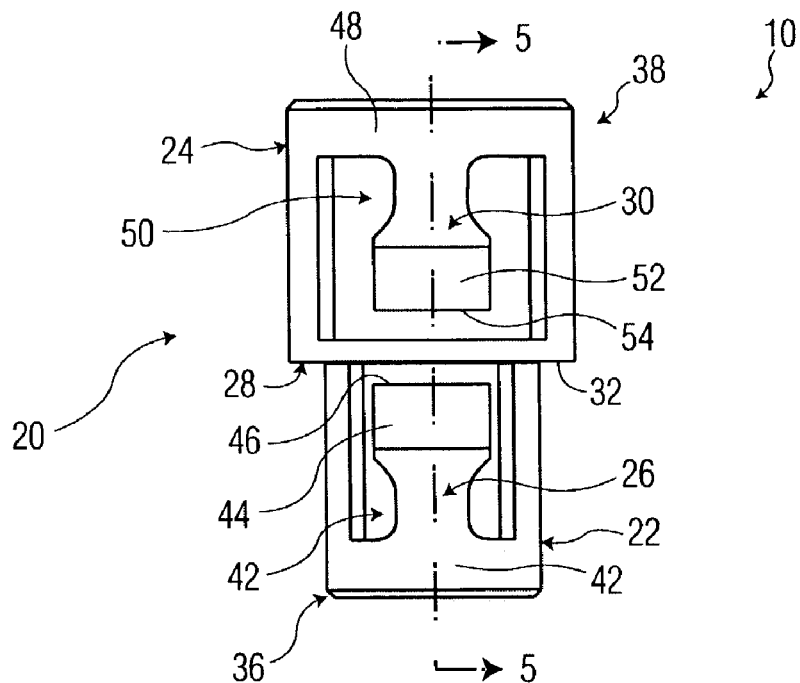
FIG. 4 is a side elevational view of the fastener in accordance with the present invention.

With reference to FIG. 4, a side elevational view of the fastener 10 is shown to illustrate the configuration of the first and second arms 26 and 30, respectively, within the corresponding recesses 42 and 50.

Figure 5:
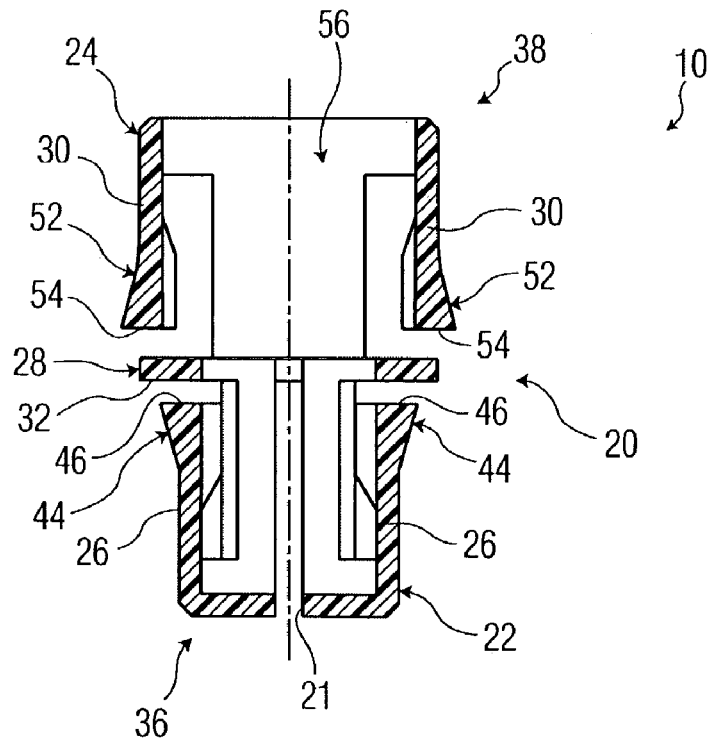
FIG. 5 is a cross sectional view of the fastener taken along lines 5—5 of FIG. 4.

With reference to FIG. 5, a cross sectional view of the fastener 10 taken along lines 5—5 of FIG. 4 is shown. The free ends 44 and 52 of the first and second arms 26 and 30, respectively, forms a lip or flared portion that protrudes outwardly and tapers towards the respective free ends 36 and 38, respectively.

Figure 6:
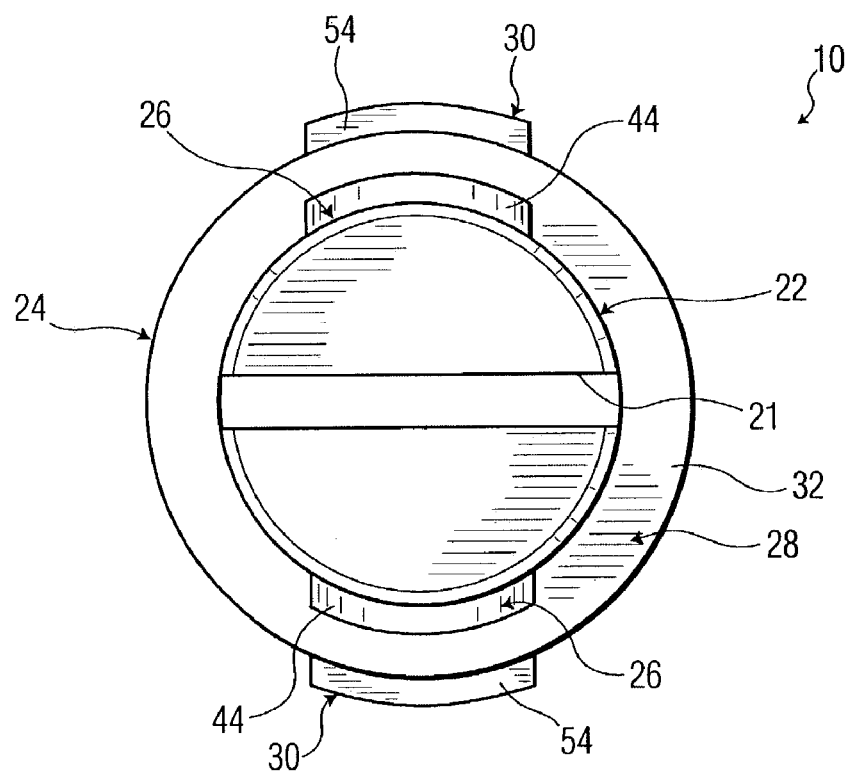
FIG. 6 is a plan view of the first end of the fastener.
Figure 7:
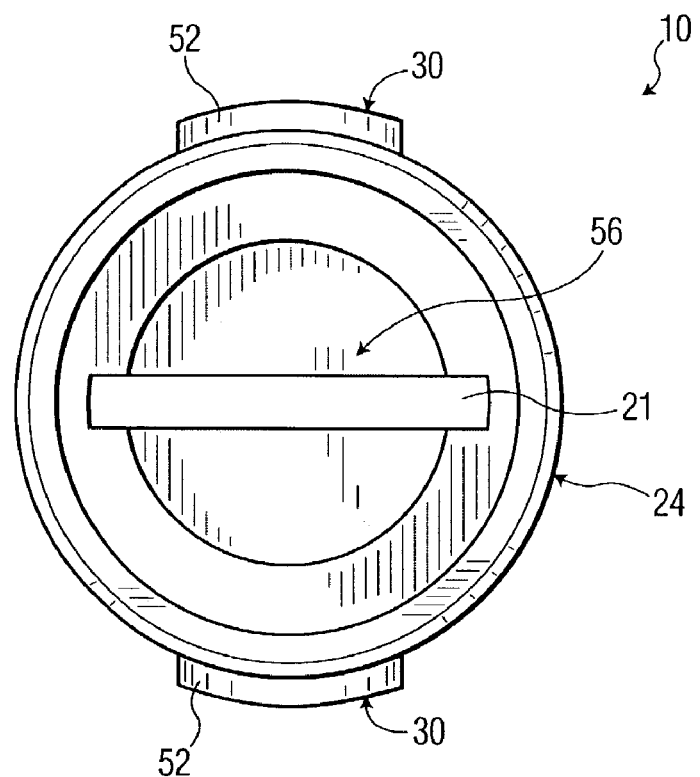
FIG. 7 is a plan view of the second end of the fastener.

Referring to FIGS. 6 and 7, the free ends 44 and 52 of the first and second arms 26 and 30, respectively, protrude outward relative to the respective first and second tubular portions 22 and 24. The tapered outside surface of the free ends 44 and 52 produces a camming effect which facilitates the insertion of the respective distal ends 36 and 38 of the fastener 10 into the apertures 16 and 17 of the fence members.

Figure 8:
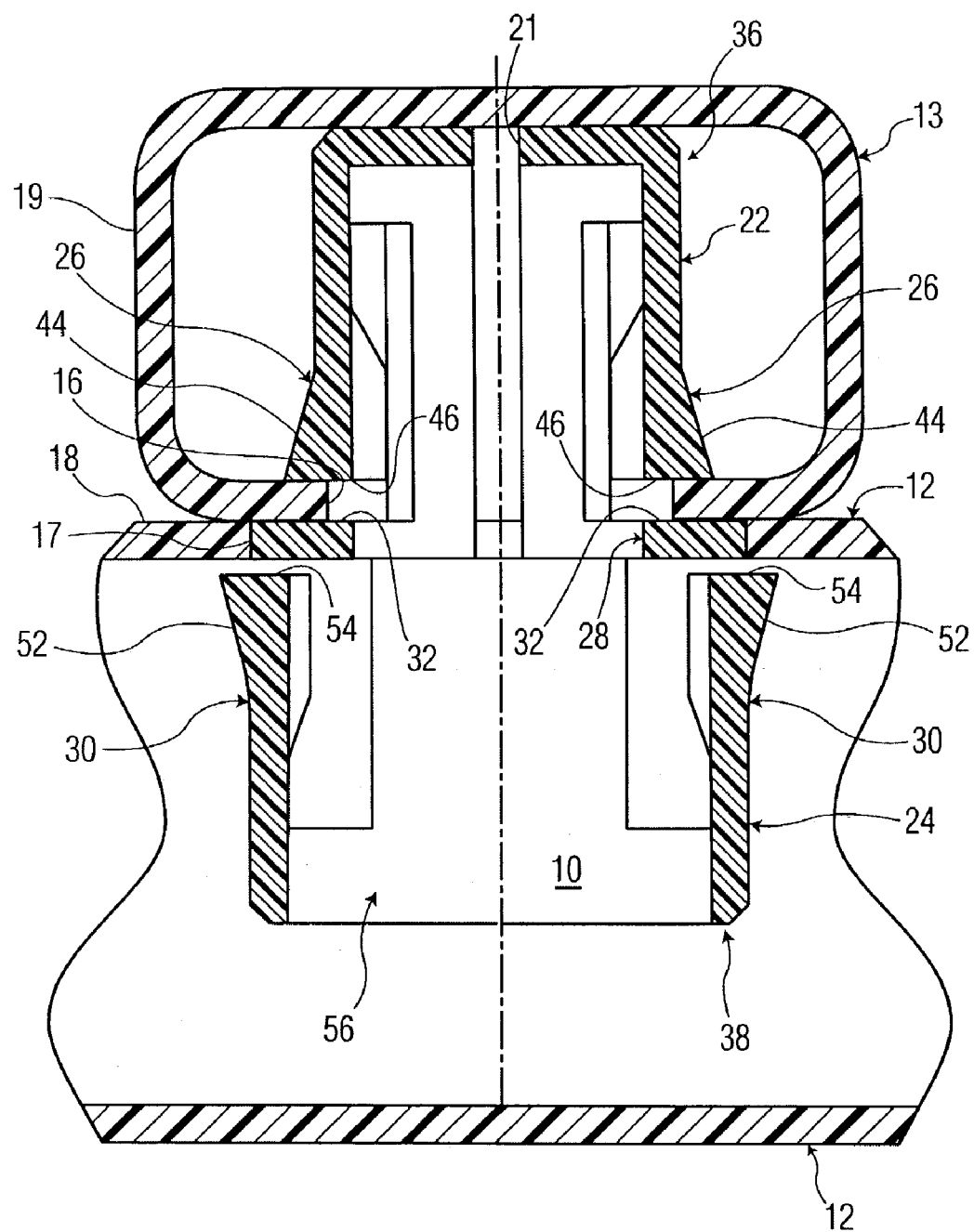
FIG. 8 is a cross sectional view of the fastener and a fence unit taken along lines 8—8 of FIG. 1A.

With reference to FIG. 8, a cross sectional view of a post 13 fastened to a cross support 12 by a fastener 10 taken along lines 8—8 of FIG. 1A is shown. The first tubular portion 22 is located within the post 13 through the aperture 17. The periphery of the aperture 17 is captively retained by the fastener 10 between the retaining end surface 46 of the first arms 26 and the shoulder surface 32 of the flange 28. In the preferred embodiment, the length of the first tubular portion 22 is substantially equal to the interior width of the slat 14 or post 13 to help maintain the opposing wall integrity and dimensions. The second tubular portion 24 is located within the cross support 12 through the aperture 16. The periphery of the aperture 16 is captively retained between the sidewall 19 of the post 13 and the retaining end surface 54 at the free ends of the second arms 30 of the fastener 10.

Referring specifically to FIGS. 1A through 8, the operation of the fastener 10 will now be described. The fastener 10 is used for attaching fence members such as the fence slats 14, the cross supports 12 and the stationary supports 13. As shown in FIG. 1B, one end of the fence slat 14 is connected to the horizontal cross support 12. Each fence slat 14 contains two apertures 17 dimensioned for receiving the second tubular portion 24 of a fastener 10. The apertures 17 of the fence slat 14 are each positioned in proximity to the intended location of the corresponding cross supports 12. The cross supports 12 similarly include apertures 16 that correspond with the desired location and spacing of the fence slats 14. The aperture 16 are dimensioned for receiving the first tubular portion 22 of a fastener 10.

The first tubular portion 22 of the fastener 10 is inserted into the aperture 16 of the cross support 12. As the fastener 10 slides into the aperture 16, the first arms 26 retract or bend inward toward the central axis as the tapered free ends 44 of the first arms 26 generates a cam effect. The fastener 10 is pushed through the aperture 16 until the free ends 44 of the first arms 26 clear the wall along the periphery of the aperture 16 and the first arms 26 return or snap back to the unloaded position. In the unloaded position, the free ends 44 of the first arms 26 seat snugly around the periphery of the aperture 16. The shoulder surface 32 of the flange 28 contacts and abuts against the outer surface of the sidewall 18 of the cross support 12, thus immobilizing the fastener 10 in place and preventing further insertion into the cross support 12. The fastener 10 must be fully inserted and this occurs only after the first arms 26 have passed through the aperture 16 to the extent that they move into the unloaded position. It is preferential that the fastener 10 is always first inserted with the smaller first tubular portion 22 into an associated aperture such as 16 having a smaller diameter than an aperture such as 17 of the other fence component, for example.

After inserting all of the fasteners 10 into the top and bottom cross supports 12, the cross supports 12 are ready for connection to the fence slats 14, and the posts 13. Similar to the connection process to the cross support 12, the second tubular portion 24 is inserted into the aperture 17 in the fence slat 14 as shown in FIG. 1B. As the fastener 10 slides into the aperture 17, the second arms 30 retract inward toward the central axis so as to permit passage through the aperture 17. After the second arms 30 have passed completely through the aperture 17, the second arms 30 return to the unloaded position, and seat snugly around the periphery of the aperture 17. The process is repeated for the other end of the fence slat 14. The posts 13 are similarly connected or attached to the cross supports 12, as the slats 14.

Figure 9:
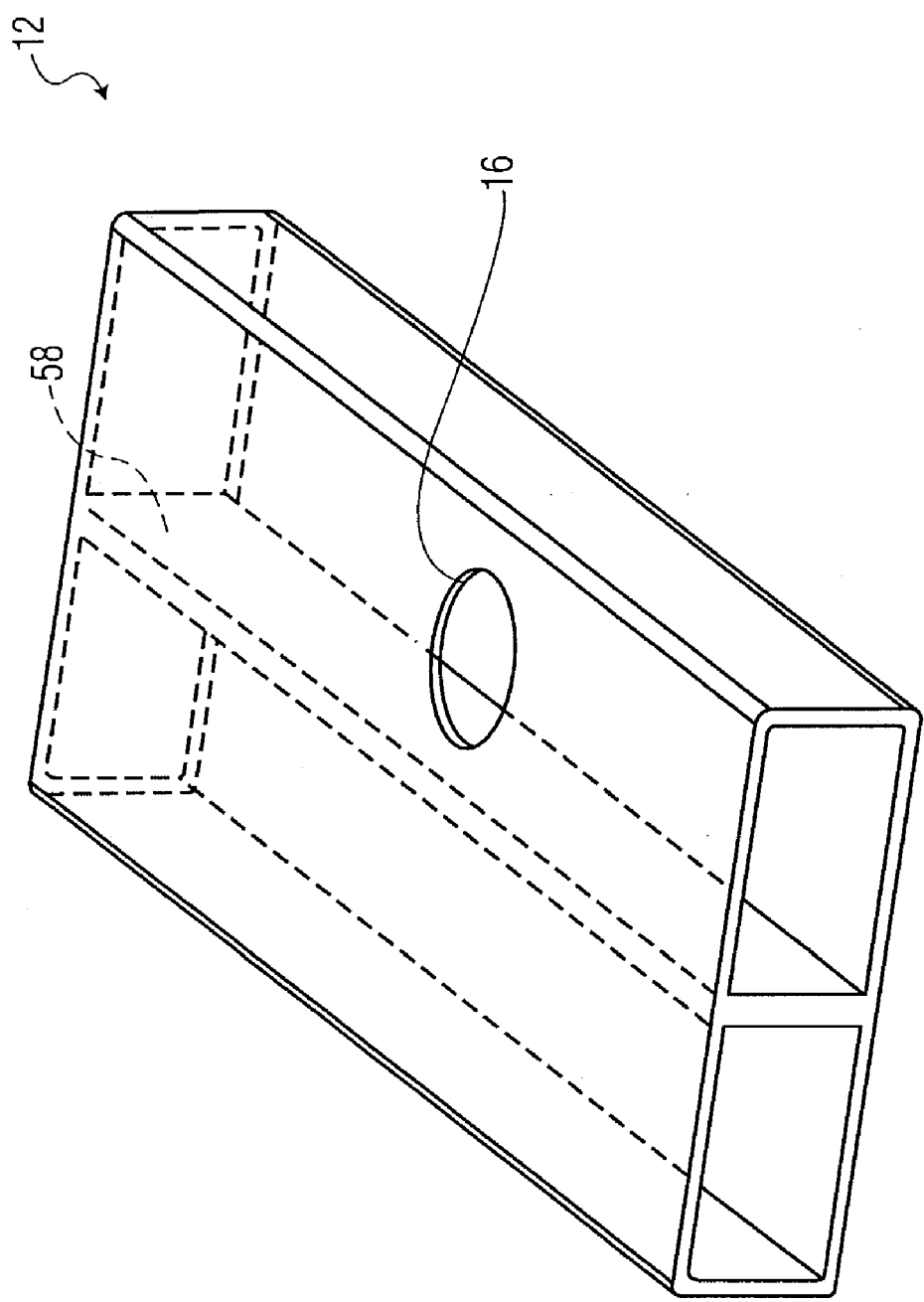
FIG. 9 is a perspective view of a portion of a fence member with the hidden interior portion indicated in dotted lines for one embodiment of the present invention.
Figure 10:
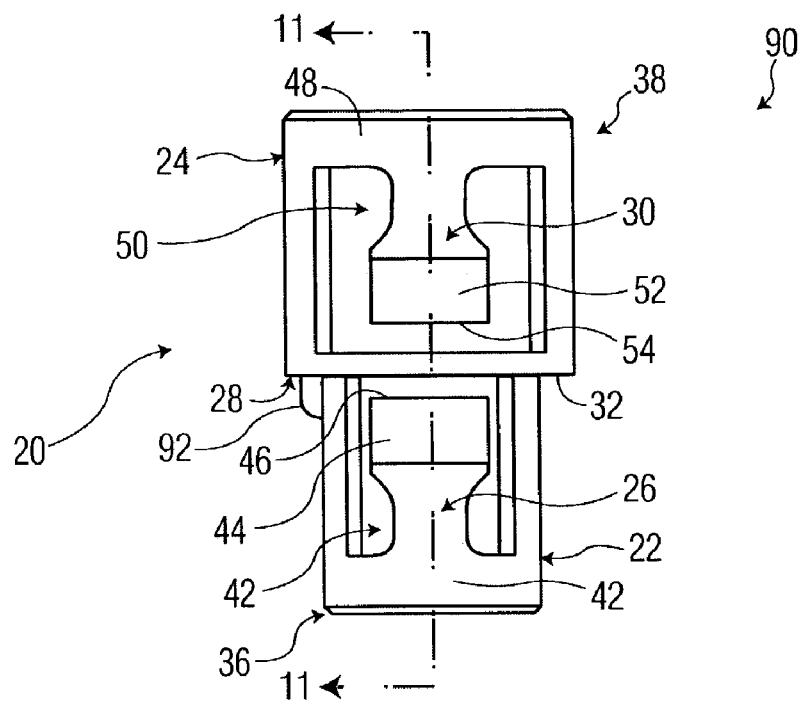
FIG. 10 is an elevational view of the fastener for a second embodiment of the present invention.
Figure 11:
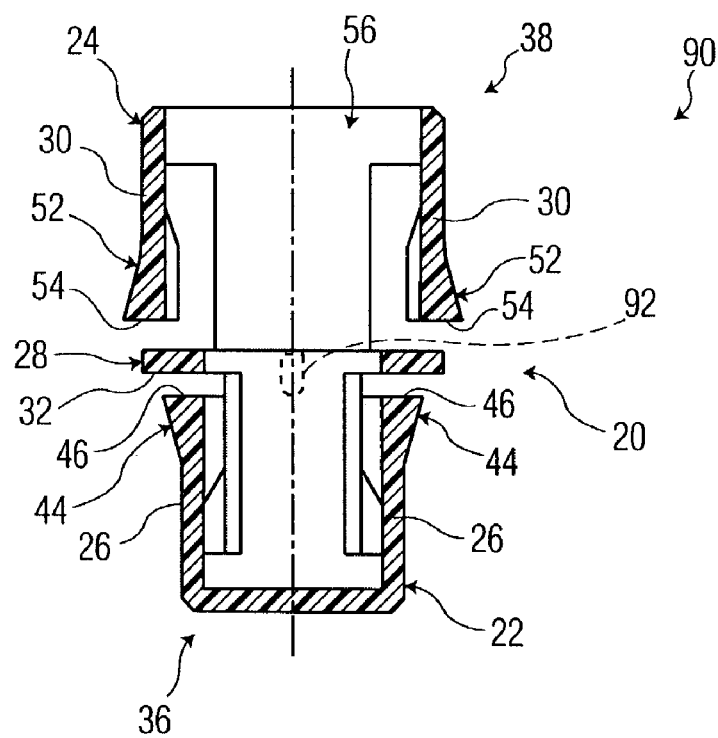
FIG. 11 is a cross sectional view of the fastener along lines 11—11 of FIG. 10.
Figure 12:
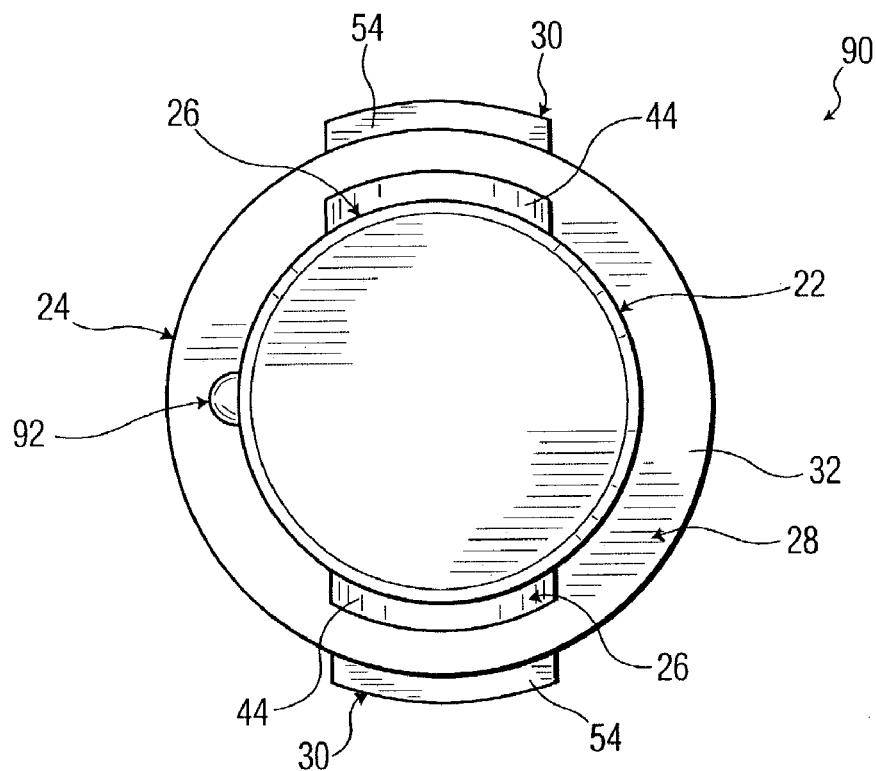
FIG. 12 is a plan view of the first end of the fastener of FIG. 10.
Figure 13:
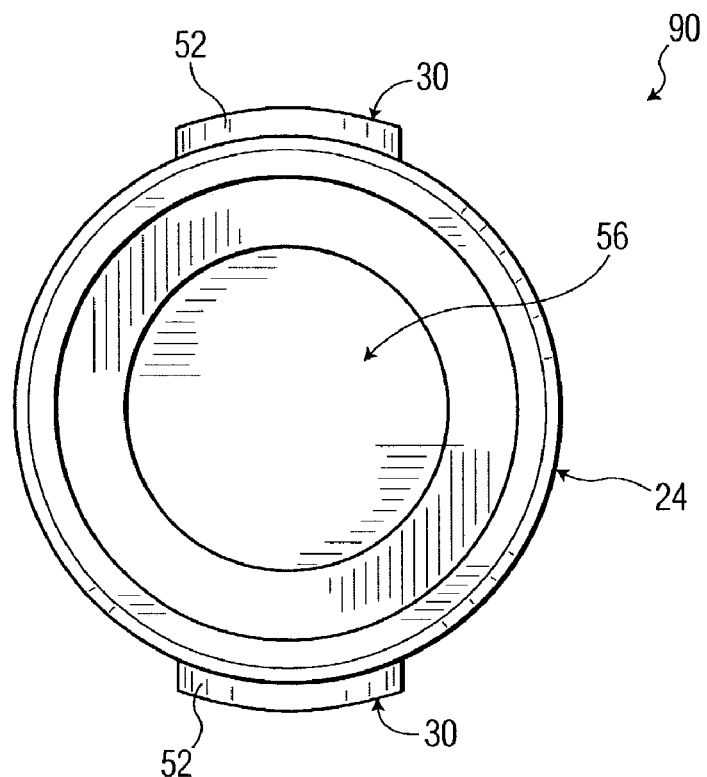
FIG. 13 is a plan view of the second end of the fastener of FIG. 10.

With reference to FIG. 9, a portion of a hollow fence member 12 is shown including a reinforcing partition 58 extending along the interior length thereof for enhancing strength and rigidity of the member 12. The aperture 16 for receiving the fastener 10 of the present invention is disposed in the sidewall 18 proximate the partition 58. Alternatively, aperture 16 can be centered over rib 58, and the slot 21 of the fastener 10 can be installed over the rib 58, for example.

Figure 14:
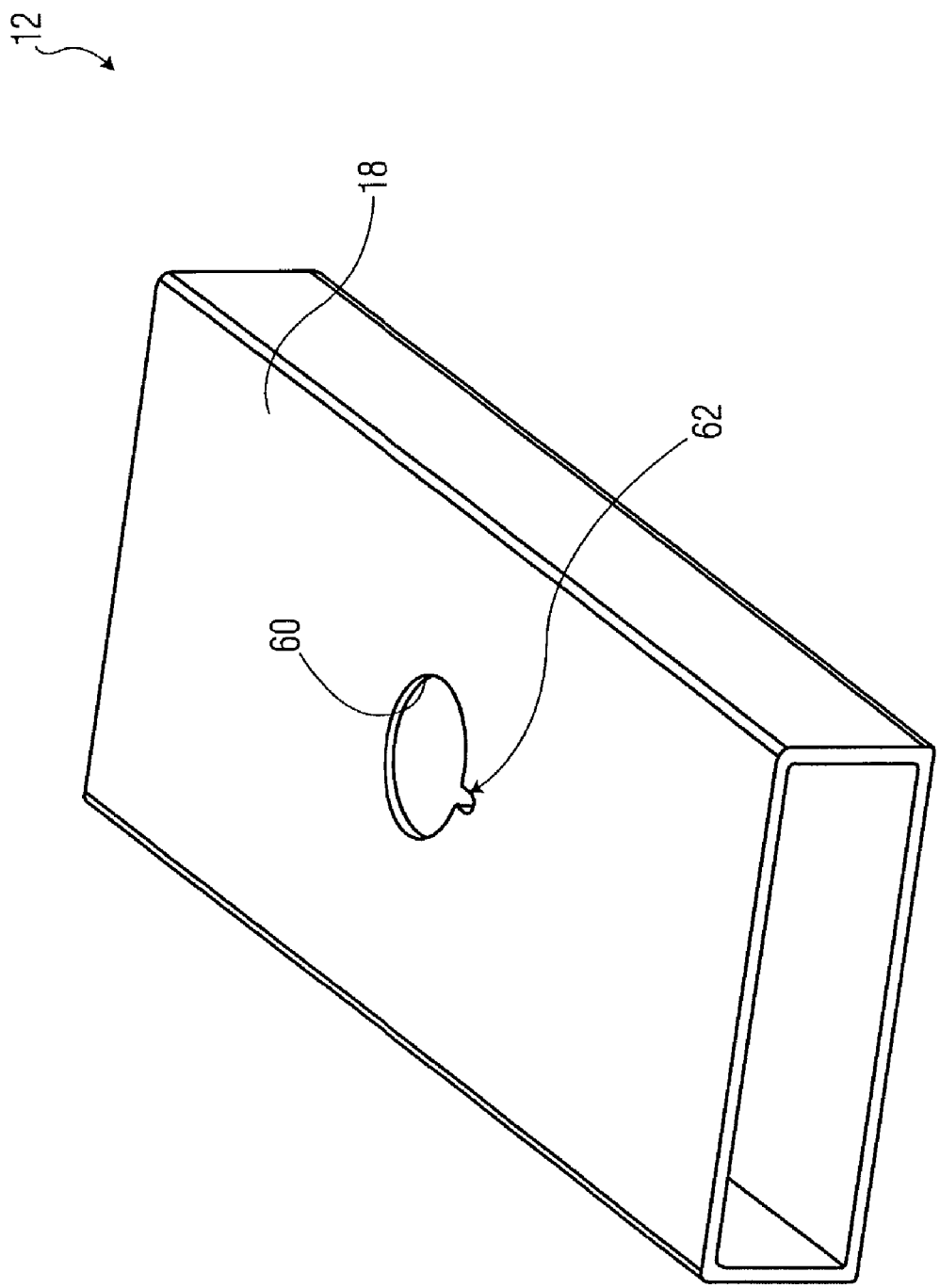
FIG. 14 is a perspective view of a fence member adapted for securing engagement with the fastener of FIG. 10.

For the previously described first embodiment of the invention, the fasteners 10 are free to rotate in the fence assembly. Referring to FIGS. 10 through 13, a fastener 90 is shown for a second embodiment of the present invention. The fastener 90 comprises all the features of the fastener 10 shown in FIGS. 2 and 3. The fastener 90 further comprises a protrusion 92 located proximate to the flange 28 at the base portion 34 of the first tubular portion 22. The first tubular portion 22 is configured to be inserted a fence member 12 shown in FIG. 14 having an aperture 60 with a notch 62 for receiving the protrusion 92 to fix the fastener 90 in place and prevent any rotational movement within the aperture 60.

Figure 15:
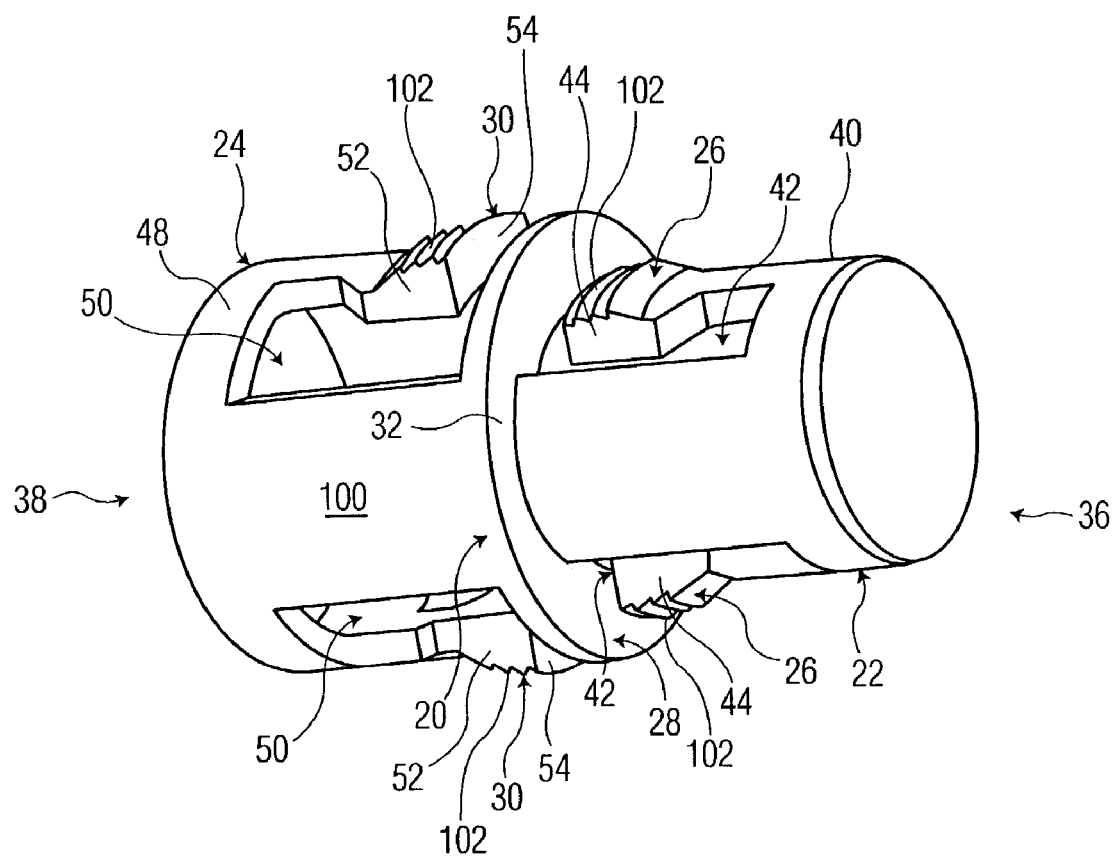
FIG. 15 is a perspective view of the fastener for a third embodiment of the present invention.
Figure 16:
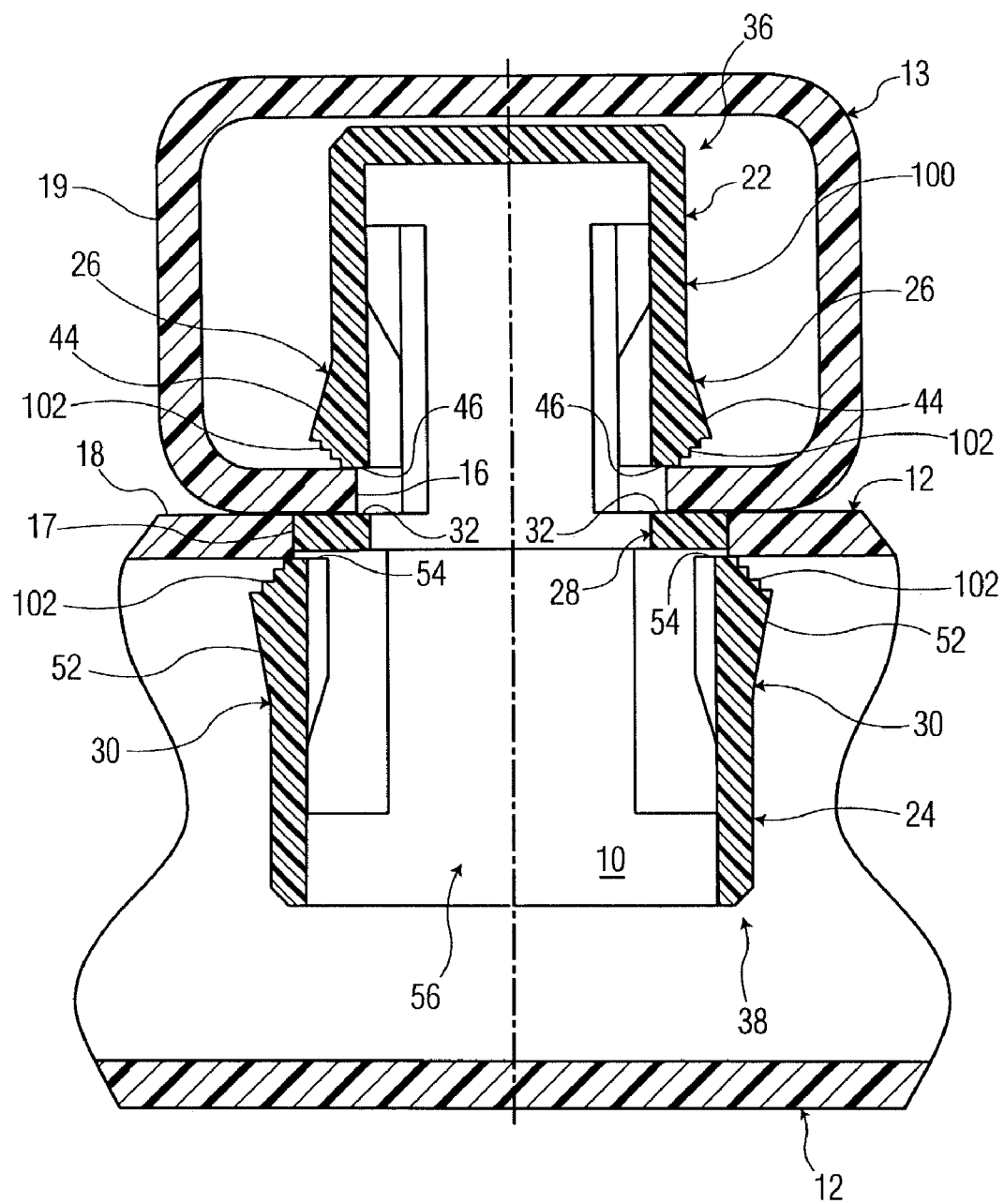
FIG. 16 is a cross sectional view of the fastener of FIG. 15 securing together a pair of fence members to one another.
Figure 17:
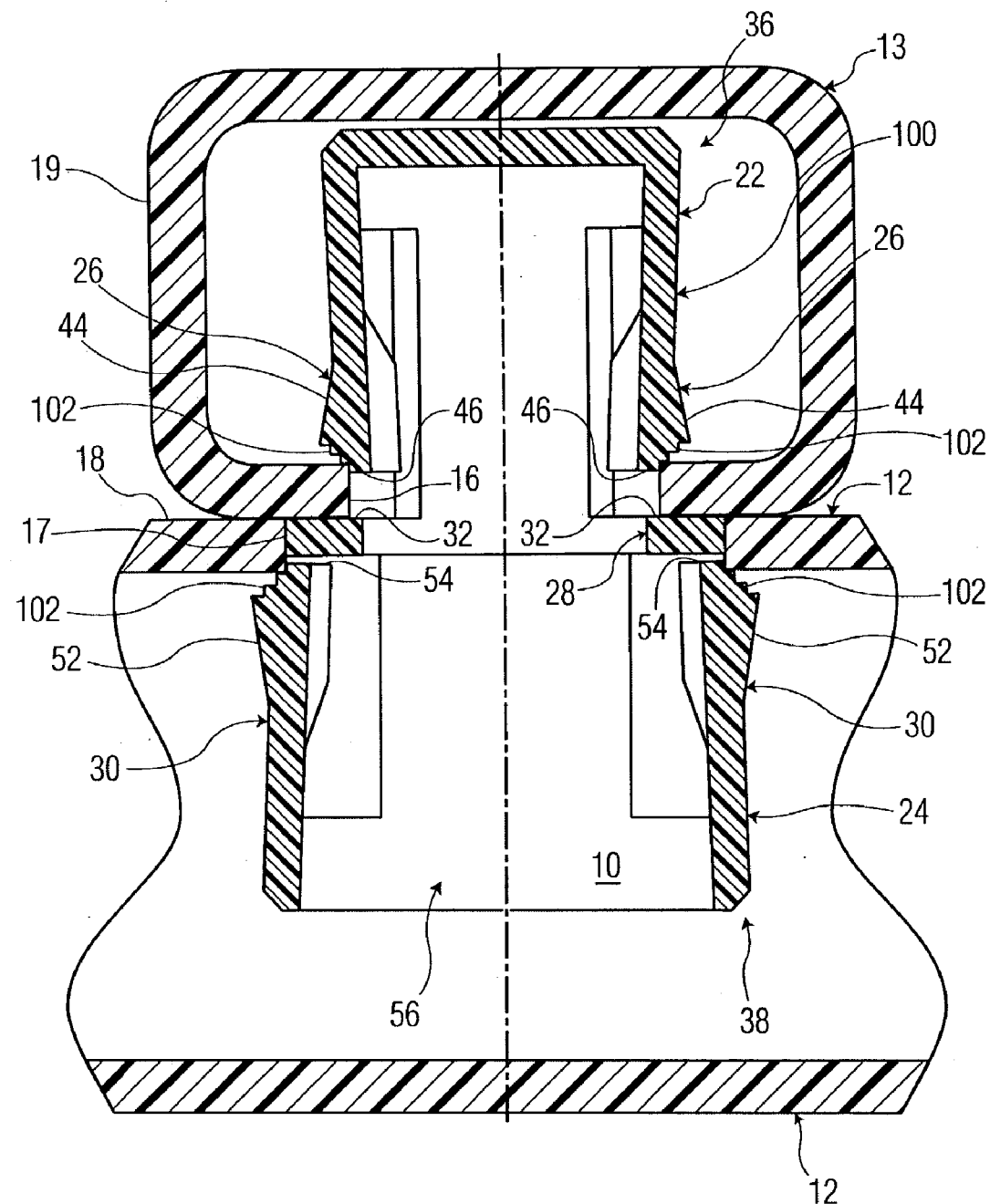
FIG. 17 is a cross sectional view of the fastener of FIG. 15 securing together a pair of fence members having thicker wall members than those of FIG. 16.
Figure 18:
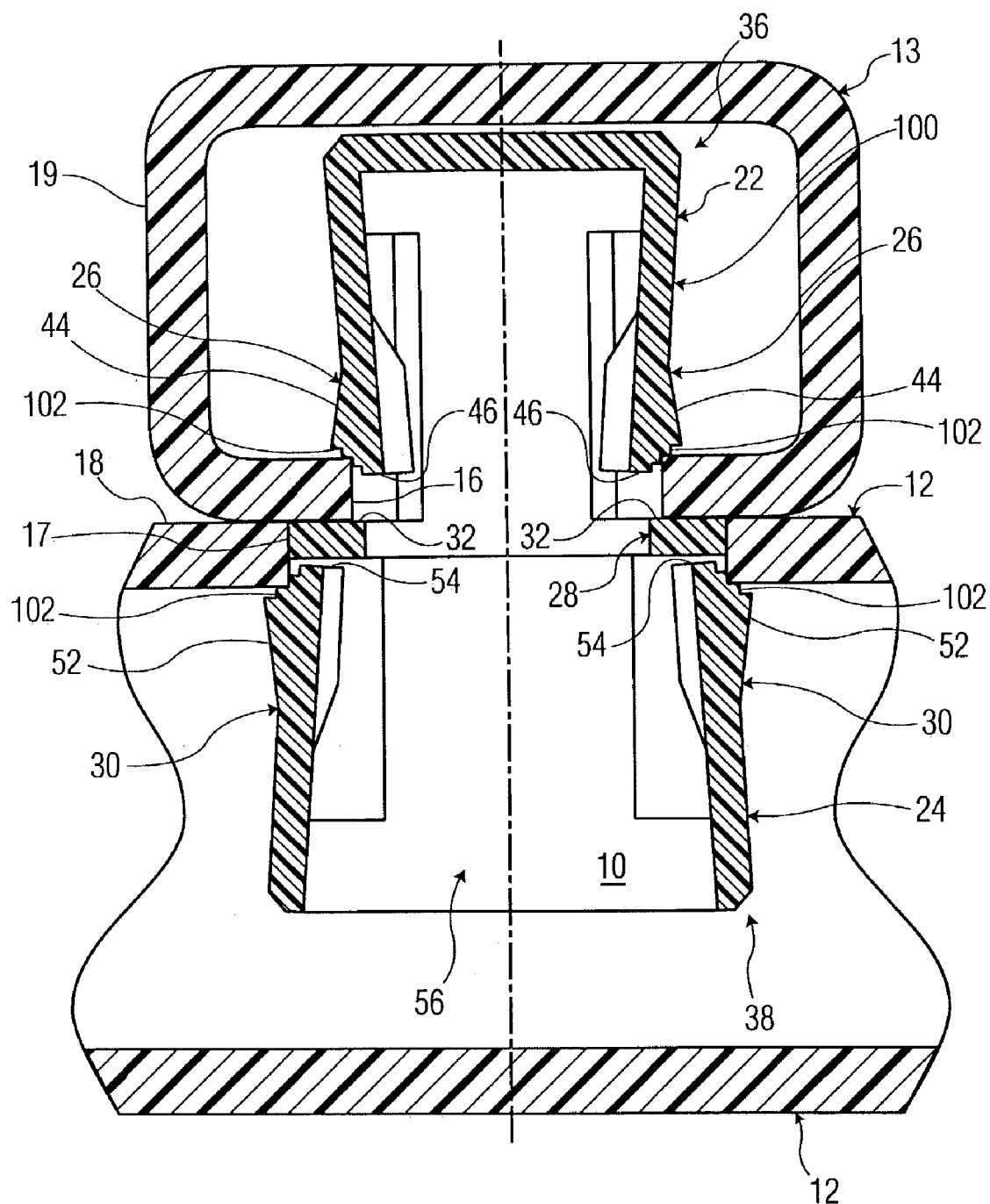
FIG. 18 is a cross sectional view of the fastener of FIG. 15 securing together a pair of fence members having thicker wall members than those of FIG. 17.
Figure 19:
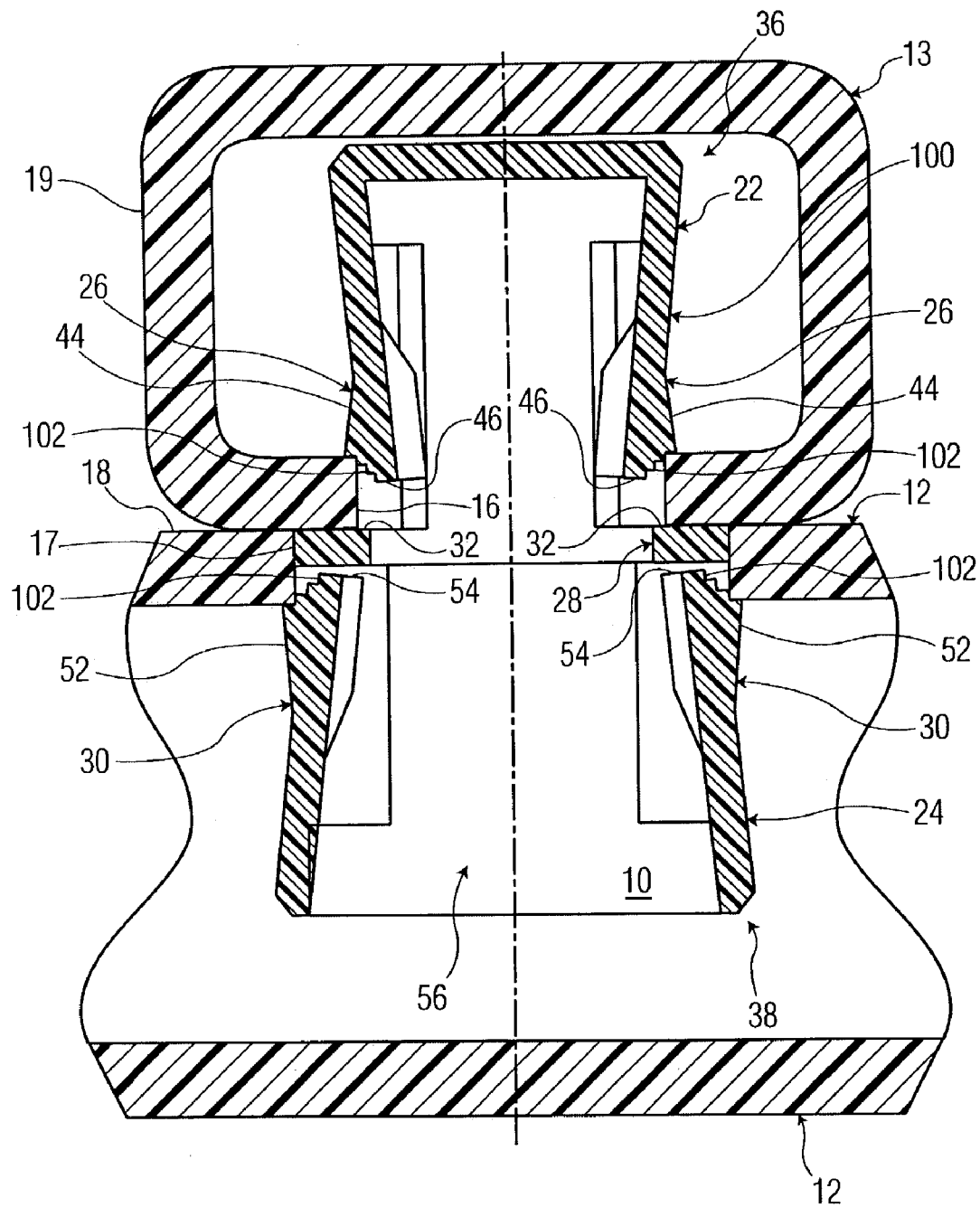
FIG. 19 is a cross sectional view of the fastener of FIG. 15 securing together a pair of fence members having thicker wall members than those of FIG. 18.

Referring to FIG. 15, a fastener 100 is shown for a third embodiment of the present invention. The free ends 44 and 52 of the first and second arms 26 and 30, respectively, each include stepped portions 102, respectively. The stepped portions 102 are adapted to facilitate the use of the fastener 100 to secure together fence components having varying thicknesses in their respective sidewalls such as sidewalls 18 and 19, shown in FIG. 8, where the first and second arms 26 and 30 are prevented from extending fully into the unloaded position. As shown in FIG. 16, the first and second arms 26 and 30 are able to extend into the unloaded position, and retain the sidewalls 18 and 19, respectively, by the corresponding retaining end surfaces 46 and 54 thereof through pawl-like action. As shown in FIGS. 17 through 19, for progressively greater thicknesses of sidewalls 18 and/or 19, respectively, the first and second arms 26 and 30 are prevented from engaging the respective sidewalls 18 and 19 via the retaining end surfaces 46 and 54, respectively. However, the stepped portions 102 effectively engage the sidewalls 18 and 19, respectively, and prevent withdrawal of the fastener 100 from the cross support 14 and the fence slat 12. In this manner, the stepped portions 102 enhance the capability of the fastener 100 to operatively accommodate and engage varying sidewall thicknesses.

Figure 20:
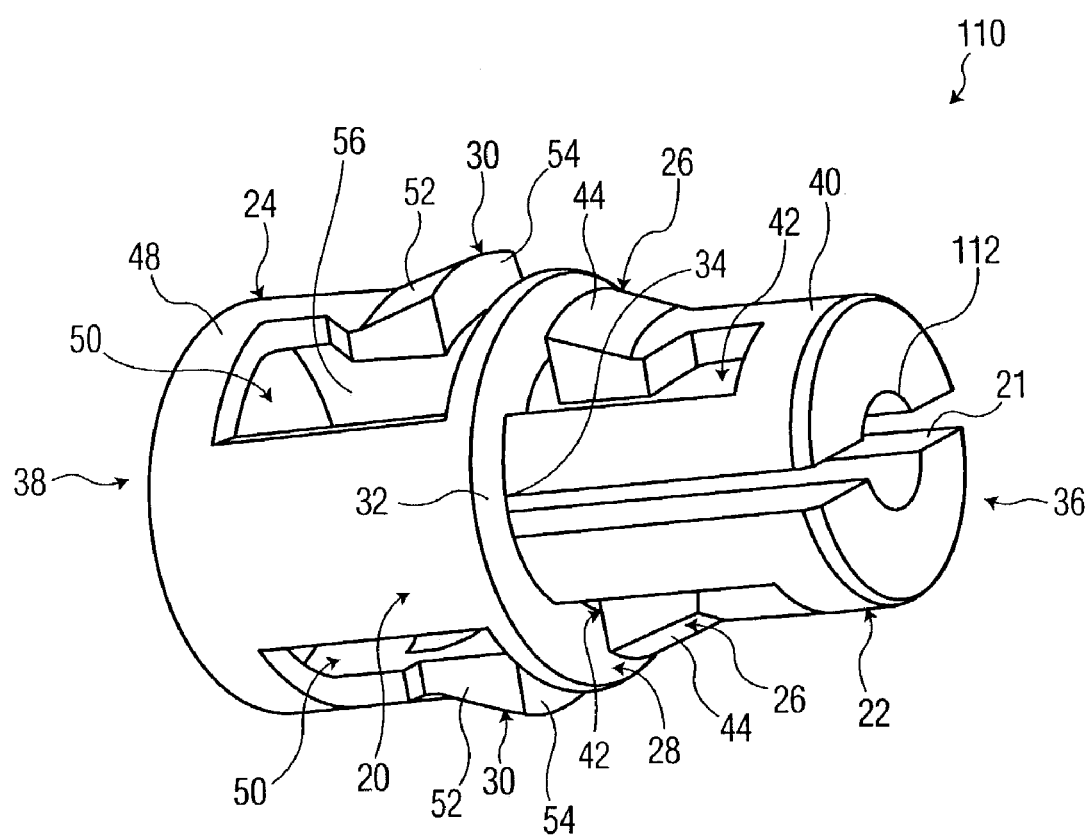
FIG. 20 is a perspective view of a fastener for a fourth embodiment of the present invention.

Referring to FIG. 20, there is shown a fastener 110 for a fourth embodiment of the present invention. The fastener 110 includes all the features of the fastener 10 shown in FIG. 2. The fastener 110 further includes an opening 112 located at the distal end 36 thereof. The opening 112 provides a passage of objects such as wires and the like through the interior cavity 56 from one end to the other.

Although various embodiments of the invention have been shown and described, they are not meant to be limiting. Those of skill in the art may recognize various modifications to these embodiments, which modifications are meant to be covered by the spirit and scope of the appended claims. For example, a fastener can be provided with the first illustrated embodiment, and further with any one or more of the second through fourth embodiments. Also, a fastener can be provided having the second portion 24 identical to the first portion 22, whereby the flange 28 will provide a stop surface for each portion, but rather than allowing the two members being joined together to have opposing sidewall surfaces in direct contact with one another as in the other embodiments, the opposing surfaces will be separated by the width of the flange. Also, the present fasteners are not limited to a tubular configuration, but can alternatively have a square, rectangular, triangular, or any other geometry within practical limits. The tubular configuration is preferred from a fabrication standpoint on permitting the use of round holes in the members to be joined by the fasteners.

What is claimed is:

1. A fastener for securing first and second members together at opposing respective flat surfaces thereof, whereby at the point of joining said first member has an aperture concentric with an aperture of said second member, the circumferences of each aperture having a wall thickness, said fastener comprising:
   first and second body portions concentric with one another, whereby said second body portion is of reduced outside diameter relative to said first body portion;
   a flange of uniform thickness forming a transverse interior end of said first body portion, an interior end of said second body portion being rigidly joined to said flange, said flange including an internal diameter surface flush with an internal diameter surface of said second body portion, and having an external diameter surface flush with an external diameter surface of said first body portion;
   at least one resilient first arm being formed in and extending from a sidewall of said second body portion toward an outer face of said flange, said at least one resilient first arm having a free end including a retaining end surface adapted for having close proximity to a first side of and surrounding the aperture of the first member, said free end of said first arm being tapered outwardly from said sidewall, and being resiliently inwardly movable by camming contact with the periphery of the aperture in the first member as said at least one resilient first arm passes through the aperture in the first member, whereby when said retaining end surface moves free of the aperture, said at least one resilient first arm moves outwardly to a position where a bottom portion of its retaining end surface opposes and engages a portion of an inside face of said first member extending inward from an edge portion of the associated aperture, for captively retaining the entire wall thickness of the aperture of said first member between the internal diameter surface of said flange and the retaining end surface of said first arm; and
   at least one resilient second arm being formed in and extending from a sidewall of said first body portion toward an inside face of said flange, said at least one resilient second arm having a free end including a retaining end surface adapted for having close proximity to a first side of and surrounding the aperture of the second member, said free end of said second arm being tapered outwardly from said sidewall of the first body portion, and being resiliently and inwardly movable by camming contact with the periphery of the aperture in the second member as said at least one resilient second arm passes through the aperture in the second member, whereby when said retaining end surface moves free of the aperture, said at least one resilient second arm moves outwardly to a position where a bottom portion of its retaining end surface opposes a portion of an inside face of said second member extending inward from an edge portion of the associated aperture, for captively retaining between its retaining end surface and the retaining end surface of said first arm, the entire wall thicknesses about portions of the apertures of said first and second members, respectively, the spacing between the retaining ends of said resilient first and second arms being configured for retaining together and permitting the opposing flat surfaces of said first and second members, respectively, to be in direct contact with one another.

2. The fastener of claim 1, wherein at least one of the distal ends of said first and second body portions is open.

3. The fastener or claim 1, wherein the distal end of said second body portion includes an aperture.

4. The fastener of claim 1, wherein the free end of the at least one first arm includes a stepped portion adapted for operative engagement with the periphery of the aperture of said first member.

5. The fastener of claim 1, wherein the free end of the at least one second arm includes a stepped portion adapted for operative engagement with the periphery of the aperture of said second member.

6. The fastener of claim 1, further comprising at least one radial protrusion disposed on the sidewall of the second portion for mating with a notch formed in the aperture of said first member, thereby preventing rotation of said fastener.

7. The fastener of claim 1, wherein the at least one first arm on the second body portion is a pair of opposing first arms, and the at least one second arm on the first body portion is a pair of opposing second arms.

8. The fastener of claim 1, wherein at least one of said first and second body portions is tubular, and said resilient first and second arms are configured for permitting rotation of said first and second members relative to one another, when secured together via said fastener.

9. The fastener of claim 1, wherein at least one of said first and second body portions includes a slot extending therealong.

10. The fastener of claim 9, wherein at least one of the distal ends of said first and second body portions further includes an aperture.

11. The fastener of claim 1, wherein the first and second body portions are formed from polymeric material.

12. The fastener of claim 11, wherein the polymeric material is selected from the group consisting of polyvinylchloride, polystyrene, polycarbonate and polyamide.

13. A fastener for securing first and second members together at opposing respective flat surfaces thereof, whereby at the point of joining said first member has an aperture concentric with an aperture of said second member, the circumferences of each aperture having a wall thickness, said fastener comprising:
   first and second tubular portions concentric with one another;
   a circular flange of uniform thickness forming on a first side a transverse interior end of said first tubular portion, and forming on an opposing second side a transverse interior end of said second tubular portion, the interior ends of said first and second tubular portions each being rigidly joined to said circular flange, said circular flange comprising a ring structure having an internal diameter surface flush with an internal diameter surface of said second tubular portion, and having an external diameter surface flush with an external diameter surface of said first tubular portion;

at least one resilient first arm being formed in and extending from a sidewall of said second tubular portion toward the second side of said flange, said at least one resilient first arm having a free end including a retaining end surface adapted for having close proximity to a first side of and surrounding the aperture of the first member, and said free end of said first arm being tapered outwardly from said sidewall, and being resiliently inwardly movable by camming contact with the periphery of the aperture in the first member as said at least one resilient first arm passes through the aperture in the first member, whereby when said retaining end surface moves free of the aperture, said at least one resilient first arm moves outwardly to a position where a bottom portion of its retaining end surface opposes and engages a portion of an inside face of said first member extending inward from an edge portion of the aperture, for captively retaining the entire wall thickness about a portion of the aperture of said first member between the internal diameter surface of said flange and the retaining end surface of said first arm; and at least one resilient second arm being formed in and extending from a sidewall of said first tubular portion toward second side of said flange, said at least one resilient second arm having a free end including a retaining end surface adapted for having close proximity to a first side of and surrounding the aperture of the second member, said free end of said second arm being tapered outwardly from said sidewall of the first tubular portion, and being resiliently and inwardly movable by camming contact with the periphery of the aperture in the second member as said at least one resilient second arm passes through the aperture in the second member, whereby when said retaining end surface moves free of the aperture, said at least one resilient second arm moves outwardly to a position where a bottom portion of its retaining end surface opposes a portion of an inside face of said second member extending inward from an edge portion of the aperture, for captively retaining between its retaining end surface and the retaining end surface of said first arm, the entire wall thicknesses about portions of the apertures of said first and second members, respectively, the spacing between the retaining ends of said resilient first and second arms being configured for retaining together and permitting the opposing flat surfaces of said first and second members, respectively, to be in direct contact with one another.

14. The fastener of claim 13, wherein the at least one of the distal ends of the first and second tubular portions is closed.

15. The fastener of claim 13, wherein the second tubular portion has a smaller outside diameter than the first tubular portion, said circular flange has a greater outside diameter than said second tubular portion, and said first member has an aperture of reduced diameter relative to the aperture of said second member.

16. The fastener of claim 13, wherein the at least one first arm on the second tubular portion is a pair of opposing first arms, and the at least one second arm on the first tubular portion is a pair of opposing second arms.

17. The fastener of claim 13, wherein the first and second tubular portions have the same outside diameter, whereby the diameter of said circular flange is greater than the aperture of at least one of said first and second members.

18. The fastener of claim 13, wherein the free end of the at least one first arm includes a stepped portion adapted for operative engagement with the periphery of the aperture of said first member.

19. The fastener of claim 13, wherein at least one of said first and second tubular portions includes a slot extending therealong.

20. The fastener of claim 13, wherein the free end of the at least one second arm includes a stepped portion adapted for operative engagement with the periphery of the aperture of said second member.

21. The fastener of claim 13, wherein said resilient first and second arms are configured for permitting rotation of said first and second members relative to one another, when secured together via said fastener.

22. A fastener for securing first and second members together at opposing respective flat surfaces thereof, whereby at the point of joining said first member has an aperture concentric with and of reduced diameter relative to an aperture of said second member, the circumference of each of said apertures each having a wall thickness, said fastener comprising:

first and second tubular portions concentric with one another, whereby said second tubular portion is of reduced outside diameter relative to said first tubular portion;

a circular flange of uniform thickness forming a transverse interior end of said first tubular portion, an interior end of said second tubular portion being rigidly joined to said circular flange, said circular flange comprising an uninterrupted ring structure having an internal diameter surface flush with an internal diameter surface of said second tubular portion, and having an external diameter surface flush with an external diameter surface of said first tubular portion;

at least one resilient first arm being formed in and extending from a sidewall of said second tubular portion toward an outer face of said flange, said at least one resilient first arm having a free end including a retaining end surface adapted for having close proximity to a first side of and surrounding a portion of the aperture of the first member, said free end of said first arm being tapered outwardly from said sidewall, and being resiliently inwardly movable by camming contact with the periphery of the aperture in the first member as said at least one resilient first arm passes through the aperture in the first member, whereby when said retaining end surface moves free of the aperture, said at least one resilient first arm moves outwardly for captively retaining the entire wall thickness about a portion of the aperture of said first member between said flange and the retaining end surface of said first arm; and at least one resilient second arm being formed in and extending from a sidewall of said first tubular portion toward an inside face of said flange, said at least one resilient second arm having a free end including a retaining end surface adapted for having close proximity to a first side of and surrounding a portion of the aperture of the second member, said free end of said second arm being tapered outwardly from said sidewall of the first tubular portion, and being resiliently and inwardly movable by camming contact with the periphery of the aperture in the second member as said at least one resilient second arm passes through the aperture in the second member, whereby when said retaining end surface moves free of the aperture, said at least one resilient second arm moves outward for captively retaining between its retaining end and the retaining end of said first arm, the entire wall thicknesses about portions of the apertures of said first and second members, respectively, the spacing between the retaining ends of said resilient first and second arms being configured for retaining together and permitting the opposing flat surfaces of said first and second members, respectively, to be in direct contact with one another.

23. The fastener of claim 22, wherein at least one of the distal ends of said first and second tubular portions is open.

24. The fastener or claim 22, wherein the distal end of said second tubular portion includes an aperture.

25. The fastener of claim 22, wherein the free end of the at least one first arm includes a stepped portion adapted for operative engagement with the periphery of the aperture of said first member.

26. The fastener of claim 22, wherein the free end of the at least one second arm includes a stepped portion adapted for operative engagement with the periphery of the aperture of said second member.

27. The fastener of claim 22, further comprising at least one radial protrusion disposed on the sidewall of the second tubular portion for mating with a notch formed in the aperture of said first member, thereby preventing rotation of said fastener.

28. The fastener of claim 22, wherein the at least one first arm on the second tubular portion is a pair of opposing first arms, and the at least one second arm on the first tubular portion is a pair of opposing second arms.

29. The fastener of claim 22, wherein said resilient first and second arms are configured for permitting rotation of said first and second members relative to one another, when secured together via said fastener.

30. The fastener of claim 22, wherein at least one of said first and second tubular portions includes a slot extending therealong.

31. The fastener of claim 30, wherein at least one of the distal ends of said first and second tubular portions further includes an aperture.

32. The fastener of claim 22, wherein the first and second tubular portions are formed from polymeric material.

33. The fastener of claim 22, wherein the polymeric material is selected from the group consisting of polyvinylchloride, polystyrene, polycarbonate and polyamide.

* * * * *